Feb. 16, 1932.  J. A. McGREW  1,845,166
SHOCK ABSORBER
Filed May 3, 1929
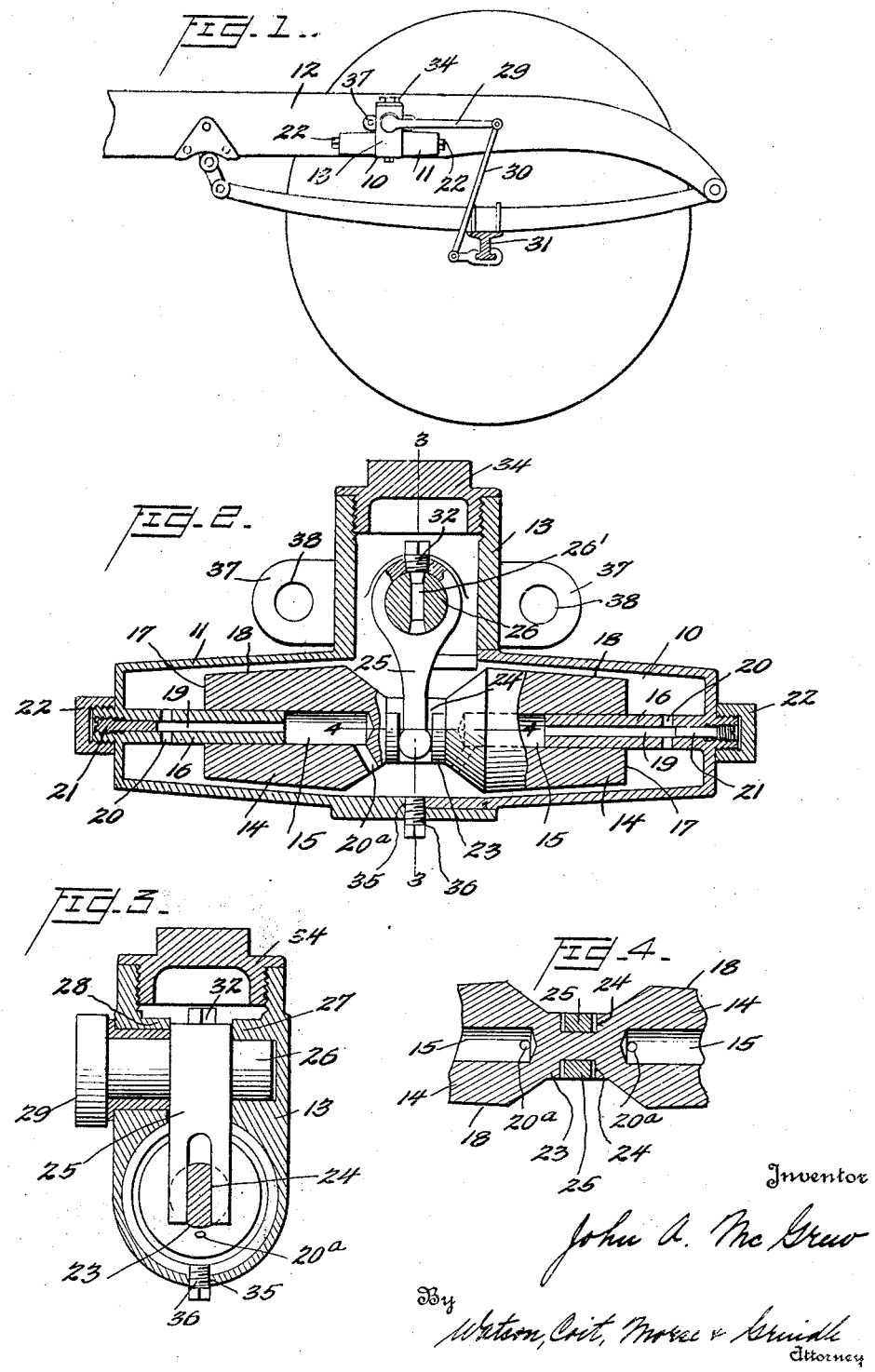

Patented Feb. 16, 1932

1,845,166

UNITED STATES PATENT OFFICE

JOHN A. McGREW, OF ALBANY, NEW YORK

SHOCK ABSORBER

Application filed May 3, 1929. Serial No. 360,203.

The present invention relates to shock absorbers, particularly to shock absorbers of the hydraulic type and used in connection with motor vehicle springs to control the compression or rebound thereof, or both compression and rebound.

The invention contemplates particularly the provision of a "two-way" shock absorber which is so designed that it offers little resistance to the relatively small deflections of the spring which result from minor imperfections in the surface of a road over which the vehicle is passing, but which offers increased resistance to major spring deflections. While shock absorbers of this general type have heretofore been designed or suggested, such prior devices have usually been rather complicated in structure generally including passages controlled by movable valves, or having other refinements rendering them comparatively expensive to manufacture and increasing the probabilities of their becoming inoperative through leakage. My present shock absorber has no moving valves, nor any delicate parts which may be either broken by ordinary usage, or thrown out of proper adjustment, and is especially suitable for use in situations where, after the original installation, it must operate for an indefinite period without care or attention.

In the accompanying drawings one embodiment of the invention is illustrated, by way of example.

In the drawings:

Figure 1 is a rather diagrammatic view of the forward end of the chassis of a motor vehicle showing the manner of attachment of the shock absorber;

Figure 2 is a longitudinal axial section through the fluid chamber of the shock absorber, showing the plunger partly in section and partly in elevation;

Figure 3 is a section on line 3—3 of Fig. 2; and

Figure 4 is a section on line 4—4 of Fig. 2.

The oil chamber of the shock absorber is generally indicated at 10 and will be seen to comprise essentially an elongated portion 11 which is normally disposed horizontally when attached to the side frame member 12 of a vehicle, and a comparatively short vertically disposed portion 13 which extends upwardly from the central part of the upper surface of the portion 11. A movable piston is housed within portion 11 of the oil chamber and this piston comprises two plunger members 14 which are either formed integral with each other or rigidly connected together. Each of the plunger portions is axially apertured, the recesses 15 thus formed being cylindrical and coaxial and slidably fitting within these recesses respectively are cylindrical members 16, the outer ends of which are integral with or rigidly secured to the end walls of the fluid chamber 11. The piston as an entirety is guided in its movements longitudinally within the oil chamber by these members 16.

Each plunger member has an annular pressure face 17 and a side wall 18 which tapers toward the pressure face, these plunger side walls being relatively long, preferably having lengths greater than the diameters of the pressure faces 17 and, at all events, longer than the radius of these pressure faces. The end portions of the elongated part 11 of the oil chamber are formed as truncated cones and the inner walls taper in the same direction as do the outer side walls of the plungers and to substantially the same degree. The diameter of the pressure face of each plunger is substantially the same as the inside diameter of the end wall of the oil chamber.

Members 16 are axially apertured as shown, each axial duct 19 comprising portion of a by-pass conduit whereby fluid may pass from one side of the plunger to the other. Each duct 19 communicates with the oil chamber through ports 20, and each recess 15 communicates with the oil chamber through a port 20a. As either plunger moves toward the adjacent oil chamber end wall it displaces the oil in front of it, and this oil flows to the rear of the plunger, either by way of the annular passage between the plunger side wall and oil chamber side wall or by way of the by-pass conduit through the piston. The effective area of each by-pass conduit may be regulated by the adjustable screw 21, the outer end of which is accessible from without and the inner end of which lies adjacent ports 20. Upon removal of cap 22 the outer end of screw 21 is made accessible and the screw may be readily turned by a tool until its forward end partially obstructs ports 20. The movement of fluid through each by-pass conduit may therefore be nicely regulated.

The two plunger members which comprise the piston are preferably rigidly connected together by a reduced neck portion 23 of generally cylindrical shape, but cut away at 24, 24 to receive the downwardly extending extremities of a bifurcated arm 25 non-rotatably mounted on a shaft 26. Shaft 26 extends transversely of the shock absorber and is supported in bearings 27 and 28 formed in the opposite walls of the vertically disposed portion 13 of the casing. Formed integrally with the shaft 26 is the arm 29, to the outer end of which may be pivotally connected a link 30, which connects the arm 29 and the axle 31. A screw bolt 32 extends through a threaded opening in the upper sleeve-like portion of arm 25 and into an opening 26′ formed in the shaft 26 and serves to prevent relative rotation of the shaft and arm. The opening in the shaft extends diametrically through the same for the purpose of permitting the direction of arm 29 to be reversed. Thus, when screw bolt 32 is removed the arm 29 may be rotated through 180° in bearings 27 and 28 and the screw bolt 32 inserted in the opposite end of the opening 26′. It is possible to use any shock absorber so constructed upon either side of the vehicle and at either end without change in its construction, as will be apparent.

The top of the vertically disposed cylindrical portion 13 of the casing or chamber is closed by a plug 34 which is easily removable to insert fluid or to reach the screw bolt 32. An aperture 35 is provided for drainage purposes, a screw 36 normally closing this aperture. Ears or lugs 37, formed integral with casing 13, are provided with apertures 38 through which bolts may be passed to secure the device to the side frame member of a vehicle, or the like.

The fluid chamber or casing may be formed in various ways but I preferably form it of two principal portions. Thus the elongated chamber is built of two very similar truncated conical members, telescoped together at their inner ends. With one of these portions the top portion 13 of the casing is formed integral. Any suitable means for securing the two portions of the casing together may be employed,—mating the two under heavy pressure being a satisfactory manner.

In the operation of the shock absorber each movement of the plunger away from its mid-position is opposed by the liquid in advance of the plunger. When the movement of the plunger is relatively small the fluid escapes through the annular passage around the plunger and also through the by-pass through the plunger. When the spring recoil or compression is great the plunger moves in this way until the by-pass ports 20 are covered or obstructed and the by-pass cut off. Resistance to the further movement of the plunger is greatly increased at this point since the only escape for the oil in front of the plunger is through the annular elongated passage around the plunger. This passage decreases in cross-section as the plunger advances and so the resistance to further movement of the plunger builds up with great rapidity after ports 20 are closed. A point is very quickly reached, where the resistance to flow of oil around the plunger is so great that the plunger comes to a standstill.

By means of the adjustable flow control screws the effective areas of the two by-passes may be made equal or unequal. If the areas are equal the fluid resistances to plunger movements will be the same in both directions. If the areas are unequal the piston will move in one direction more freely than in the other. The ease with which the adjustment may be effected renders it possible for the ultimate user of the shock absorber to adjust it to his own satisfaction.

The shock absorber does not leak, and the fluid remains in the chamber indefinitely. A sufficient quantity of fluid is placed in the fluid chamber to entirely submerge the two plunger portions of the piston but the fluid level lies below the bearings 27 and 28 so that there can be no leakage here.

It will be realized by those skilled in the art that the design and arrangement of the component elements of the invention may be considerably modified without departing from the spirit and scope of the invention, as set forth in the claims appended hereto.

Having thus described the invention, what is claimed as new and desired to be secured by Letters Patent is:

1. In a shock absorber, in combination, a fluid chamber and an elongated plunger therein, said chamber and plunger being, respectively, adapted to be connected to relatively movable elements, the side walls of the chamber being tapered to substantially the same degree and in the same direction, a member rigid with the chamber which extends axially of the chamber and toward the plunger, which member is slidably received within a mating recess in the plunger, said member having a conduit therein opening into the said mating recess and into the chamber, and the plunger having a conduit therein which brings the fluid chamber into communication with said mating recess, at a point beyond the end of said member, said conduits and mating recess, taken together, constituting a conduit for by-passing fluid from one side of said plunger to the other.

2. The combination set forth in claim 1 in which means is provided for regulating the flow of fluid through said by-pass conduit.

3. In a shock absorber, in combination, a fluid chamber, a plunger adapted to reciprocate in said chamber but which remains at all times out of contact with the wall of said chamber, and a conduit for by-passing fluid from one side of said plunger to the other, which conduit is closed by the plunger at a predetermined point in its pressure resisting stroke.

4. In a shock absorber, in combination, a fluid chamber, a plunger adapted to reciprocate in said chamber, a member rigid with the chamber wall and extending toward the plunger, which member is slidably received in a mating recess in the plunger, said member having a conduit formed therein opening at one end into said recess and terminating at its other end in a port opening into the said chamber, and said plunger having a conduit therein which brings said recess into communication with said chamber, said conduits and recess comprising together a by-pass for liquid from one side of the plunger to the other, the plunger being adapted to cover said port and block the by-pass at a predetermined point in its travel.

5. The combination set forth in claim 4 in which manually adjustable means is provided for regulating the effective area of said by-pass.

6. The combination set forth in claim 4 in which a valve is provided for regulating the effective area of said by-pass, the stem of said valve being accessible from without the chamber for the purpose of adjustment.

7. In a shock absorbing device, a casing adapted to be connected to one element of a vehicle and having an elongated fluid chamber therein, having its greatest diameter at its intermediate portion and tapering toward both ends, a piston movable in said casing and adapted to be connected to another element of the vehicle, the piston having a plunger of such size that in all of its operative positions a passage will remain between the plunger and the casing, the relation between the plunger and casing being such that the effective area of said passage will vary as the piston moves longitudinally in the chamber, becoming smaller as the piston moves toward one end thereof from a central position.

8. A shock absorber comprising a casing adapted to be connected to one element of a vehicle and having an elongated fluid chamber therein, having its greatest cross-sectional area at its intermediate point and tapering toward both ends, a piston movable in said chamber and adapted to be connected to another vehicle element, said piston also tapering toward both ends and being of such size that a passage is formed between the piston and the chamber wall, the effective area of which will vary according to the position of the piston.

9. A shock absorber comprising a casing adapted to be connected to one element of a vehicle and enclosing an elongated fluid chamber having its greatest cross-sectional area at its intermediate point and tapering toward both ends, a piston movable in said casing and adapted to be connected to another vehicle element, said piston having elongated tapered plungers corresponding to the tapered ends of the chamber, whereby elongated passages of annular cross-section are formed between the plungers and casing, the relation between the plungers and chamber wall being such that the cross-sectional areas of said passages will vary rapidly as the piston moves longitudinally in the chamber.

10. A shock absorber comprising a casing adapted to be connected to a vehicle element and having an elongated chamber therein adapted to contain a fluid, a double plunger piston in said chamber and adapted to be connected to another vehicle element, the conformation of the side walls of the plungers and the adjacent walls of said chamber being such as to cause increasing resistance to the passage of fluid from one side of the piston to the other on relative movement in either direction from a central position.

11. A shock absorber comprising a casing adapted to be connected to a vehicle element and having an elongated chamber therein adapted to contain a fluid, a double plunger piston in said chamber and adapted to be connected to another vehicle element, the conformation of the plungers and the walls of said chamber being such as to cause increasing resistance to the passage of fluid from one side of the piston to the other on relative movement in either direction from a central position, and means to adjust the amount of resistance for any given position of the piston on either side of said central position.

12. A shock absorber comprising a casing adapted to be connected to one member of a vehicle and having an elongated fluid chamber therein, having its greatest cross-sectional area at its intermediate point and tapering toward both ends, a piston movable in said chamber and adapted to be connected to another vehicle member, said piston also tapering toward both ends and being of such size that a passage is formed between the piston and the chamber wall, the effective area of which will vary according to the position of the piston, a by-pass conduit leading from each end of the chamber to the central portion thereof, and means for regulating the effective area of each by-pass.

13. A shock absorber comprising in combination a casing adapted to be connected to a vehicle member and to contain a suitable fluid, a double plunger piston adapted to be connected to another vehicle element, and movable in and spaced from the side walls of said casing, studs rigidly secured to the ends of said casing and of sufficient length to continually slidably engage within recesses in the plungers, respectively.

14. A shock absorber for connecting two relatively movable elements of a vehicle, comprising a casing adapted to be connected to one of said elements, said casing enclosing a relatively large intermediate chamber and tapering end chambers adapted to contain a suitable fluid, a piston having a portion disposed within the intermediate chamber and a tapered plunger disposed within each end chamber, a lever adapted to be connected to the other of said movable elements and having a portion rotatably supported in the upper portion of the intermediate chamber, and an arm mounted on said portion and operatively connected with said piston rod.

15. A shock absorber comprising, in combination, a casing adapted to be connected to one member of a vehicle and having an elongated fluid chamber therein, said chamber having an intermediate enlarged portion and end portions tapering toward the ends of said casing, a piston movable in said chamber and adapted to be connected to another vehicle member, said piston being provided with tapered plungers adapted normally to occupy said end portions, the conformation of said plungers and the adjacent walls of said casing being such that annular passageways are formed between the plungers and chamber walls, the effective area of which will vary according to the position of the piston, a pair of members each being rigid with one end of said casing and extending axially of the chamber toward one of said plungers, each of said members being slidably received within a mating recess in the adjacent plunger, and having a conduit therein opening into said mating recess and into the corresponding end chamber, and each plunger having a conduit therein adapted to bring the intermediate fluid chamber into communication with the corresponding plunger recess at a point beyond the end of the member which is adapted to enter the same, each of said conduits and mating recesses together constituting an additional passageway for by-passing fluid from one side of a plunger to the other.

16. In a shock absorber, in combination, a fluid chamber, a double plunger piston adapted to reciprocate in said chamber but which remains at all times out of contact with the wall of said chamber and a conduit associated with each plunger for by-passing fluid from one side of said plunger to the other, said conduits being so disposed as to be closed by their corresponding plungers at predetermined points in their pressure resisting strokes.

17. In a shock absorber, in combination, an elongated fluid chamber comprising an intermediate portion and two end portions, a double plunger piston adapted to reciprocate therein, a pair of studs, each of said studs being rigidly supported by one of the ends of said chamber and adapted to be slidingly received within a mating recess formed in the outer end of one of said plungers, a conduit within each of said studs providing communication between the corresponding recess and chamber end portion, and a conduit formed in each of said plungers providing communication between the corresponding recess and the intermediate portion of said chamber, whereby there are formed by-pass passageways from one side of each plunger to the other.

In testimony whereof I hereunto affix my signature.

JOHN A. McGREW.